United States Patent [19]

Gunther et al.

[11] Patent Number: 4,937,344
[45] Date of Patent: Jun. 26, 1990

[54] NOVEL SULFUR-CONTAINING MEROCYANINE DYES

[75] Inventors: Wolfgang H. H. Gunther, West Chester, Pa.; Frederick J. Sauter, Rochester, N.Y.

[73] Assignee: Eastman Kodak Company, Rochester, N.Y.

[21] Appl. No.: 203,956

[22] Filed: Jun. 8, 1988

[51] Int. Cl.$^5$ ............................................. C07D 417/06
[52] U.S. Cl. ..................................... 544/300; 544/306
[58] Field of Search ................................. 544/300, 306

[56] References Cited

U.S. PATENT DOCUMENTS

| | | | |
|---|---|---|---|
| 3,854,956 | 12/1974 | Lincoln et al. | 548/121 |
| 3,933,507 | 1/1976 | von Konig et al. | 548/121 |
| 4,028,353 | 6/1977 | Borror | 548/121 |
| 4,473,652 | 9/1984 | Okazaki et al. | 436/536 |
| 4,524,128 | 6/1985 | Edwards et al. | 430/353 |
| 4,651,739 | 3/1987 | Oseroff et al. | 128/362 |
| 4,770,961 | 9/1988 | Tanaka et al. | 548/121 |
| 4,775,625 | 10/1988 | Sieber | 514/274 |

FOREIGN PATENT DOCUMENTS

| | | | |
|---|---|---|---|
| 405309 | 1/1934 | United Kingdom | 548/121 |
| 646900 | 11/1950 | United Kingdom | 548/121 |

OTHER PUBLICATIONS

Loew et al., Biochemistry, vol. 17, No. 19, 1978, pp. 4065–4071 "Charge Shift Optical Probes of Membrane Potential, Theory".

Cohen et al, J. Membrane Biology, 19, 1–36 (1974) "Changes in Axon Fluorescence during Activity: Molecular Probes of Membrane Potential".

Lawrence Kass, "Identification of Normal and Leukemic Granulocytic Cells with Merocyanine 540", Stain Technology, vol. 61, No. 1, 1986.

B. Kalyanaraman et al., "Photodynamic Action of Merocyanine 540 on Artificial and Natural Cell Membranes: Involvement of singlet Molecular Oxygen", Proc. Natl., Acad. Sci., vol. 84, pp. 2999–3003, May 1987.

F. Sieber et al., "Dye-Mediated Photolysis of Human Neuoblastoma Cells: Implications for Autologous Bone Marrow Transplantation", Blood, vol. 68, No. 1, pp. 32–36, Jul. 1986.

F. Sieber et al., "Dye-Mediated Photosensitization of Murine Neuroblastoma Cells", Cancer Research, vol. 46, pp. 2072–2076, Apr. 1986.

F. Sieber et al., "Dye-Mediated Photolysis of Normal and Neoplastic Hematopoietic Cells", Leukemia Research, vol. 11, No. 1, pp. 43–49, 1987.

Primary Examiner—Cecilia Shen
Attorney, Agent, or Firm—Betty J. Deaton

[57] ABSTRACT

A merocyanine dye having the formula:

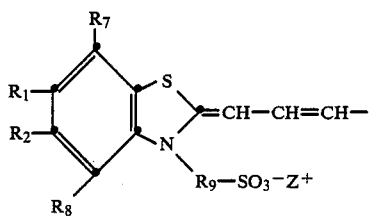

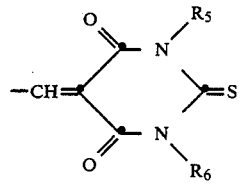

wherein:
$R_1$ and $R_2$ independently are H, alkyl, alkoxy or aryl
$R_7$ and $R_8$ are H or
any of $R_1$ and $R_2$, $R_1$ and $R_7$, $R_2$ and $R_8$ can together comprise the atoms necessary to form a fused aromatic ring on the benzene radical to which they are attached;
$R_5$ and $R_6$ comprise alkyl of from 1–18 carbon atoms provided that the sum of the carbon atoms in $R_5$ and $R_6$ is at least 8;
$R_9$ is an alkylene group of 2–9 nuclear carbon and hetero atoms; and
$Z^+$ is a cation.

This dye is useful in a method for inactivating viruses comprising contacting the viruses with the compound and exposing the resulting mixture to visible light to excite and inactivate the viruses. The compounds are also useful in the irradiation-induced inactivation of leukemia cells.

4 Claims, No Drawings

NOVEL SULFUR-CONTAINING MEROCYANINE DYES

BACKGROUND OF THE INVENTION

Viruses can cause human or animal diseases. The inability to effectively inactivate pathogenic viruses without adversely affecting their antigenic properties has made it difficult to make safe, effective vaccines for viral diseases. In addition, the presence of viruses can destroy the utility of valuable food and industrial products.

Heat treatments, the extraction of virus with solvents and detergents, and the treatment with high doses of gamma radiation can be effective means of inactivating viruses. However, those procedures are rigorous and nonspecific and their applicability is limited. As a result, there is a need for a simple, effective method for inactivating viruses.

In U.S. Pat. No. 4,775,625, by Dr. F. Sieber, it is disclosed that a merocyanine dye MC540 and the novel merocyanine dyes of the instant invention, which were received by Dr. Sieber from the present inventor, are useful as agents which preferentially bind to the lipids in enveloped viruses or virus-infected cells and which do not or bind only minimally to the other components of the cells to inactivate the viruses and virus-infected cells. The MC540 dye and its use in eliminating tumor cells from bone marrow grafts is described in "Elimination of Residual Tumor Cells from Autologous Bone Marrow Grafts by Dye-Mediated Photolysis: Preclinical Data", by Dr. Fritz Sieber in *Photochemistry and Photobiology*, Vol. 46, No. 1, pages 71–76, (1987).

There is a need for effective compounds suitable for use with photosensitization for inactivating viruses and for removing tumor cells.

BRIEF SUMMARY OF THE INVENTION

It has been discovered that novel merocyanine dyes can be brought into contact with an effective amount of a photosensitizing agent and exposed to visible light until the viruses and virus-infected cells have been inactivated. It has been found that these novel dyes are also useful for selectively killing leukemic cells in bone marrow by photosensitization.

The novel compound has the formula:

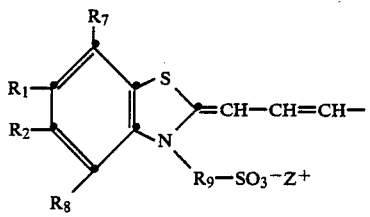

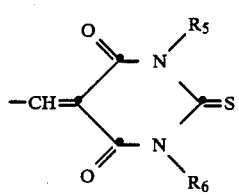

wherein:

$R_1$ and $R_2$ independently are alkyl, alkoxy, or aryl, and $R_7$ and $R_8$ are H or any of $R_1$ and $R_2$, $R_1$ and $R_7$, $R_2$ and $R_8$ can together comprise the atoms necessary to form a fused aromatic ring on the benzene radical to which they are attached;

$R_5$ and $R_6$ comprise alkyl of from 1–18 carbon atoms provided that the sum of the carbon atoms in $R_5$ and $R_6$ is at least 8;

$R_9$ is an alkylene group of 2–9 nuclear carbon and hetero atoms; and $Z^+$ is a cation.

DESCRIPTION OF THE PREFERRED EMBODIMENTS

The novel compounds useful as anti-viral agents and in the inactivation of leukemia cells have the formula:

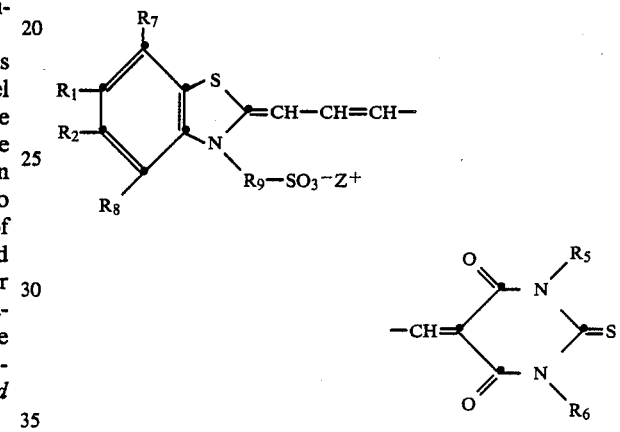

$R_1$ and $R_2$ can each independently comprise H, alkyl of about 1 to 10 carbon atoms such as methyl, ethyl, propyl, butyl, and hexyl, alkoxy, such as methoxy, ethoxy, and the like, wherein the alkyl group contains from 1 to 3 carbon atoms and aryl, such as phenyl, including substituted phenyl, such as tolyl, and the like.

$R_7$ and $R_8$ are H or any pair of $R_7$ and $R_1$, $R_1$ and $R_2$ or $R_2$ and $R_8$ can comprise the atoms necessary to form together with the atoms on the benzene radical to which they are attached, a fused aromatic ring, such as a benzo ring, including a substituted benzo ring, such as a methyl-substituted benzo ring and the like.

$R_5$ and $R_6$ comprise alkyl groups containing from about 1 to about 18 carbon atoms provided that the sum of the carbon atoms in $R_5$ and $R_6$ is at least 8 such as methyl, ethyl, propyl, butyl, heptyl, and including branched and substituted alkyl, such as chloropropyl, methoxymethyl, isopropyl, benzyl, t-butyl, sec-butyl, neopentyl, and the like.

$R_9$ is a straight or branched alkylene group of 2 to 9 nuclear atoms forming the alkylene chain including alkylene chains comprising hetero atoms, or hetero atom-containing groups in the linear alkylene chain or nucleus in the case of branched chains, for example, ethylene, ethylidene, trimethylene, propylene, propylidene, benzylidene, 3-oxo-4-imino-5,5-dimethyl-1,6-hexylene, and the like, preferably $R_9$ is a trimethylene group.

$Z^+$ is any cation such as $Na^+$, $\frac{1}{2}Ba^{2+}$, $(C_2H_5)_3NH^+$, $K^+$, $NH_4^{30}$, and $Li^+$.

The preferred sulfur-containing merocyanine dyes of the invention include:

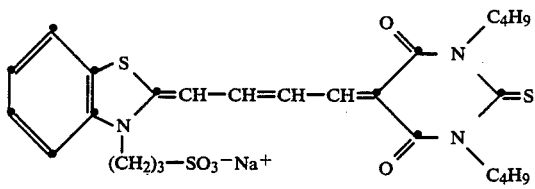

Compound 1

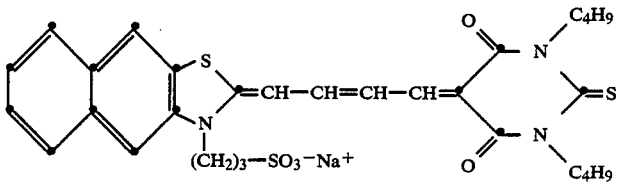

Compound 2

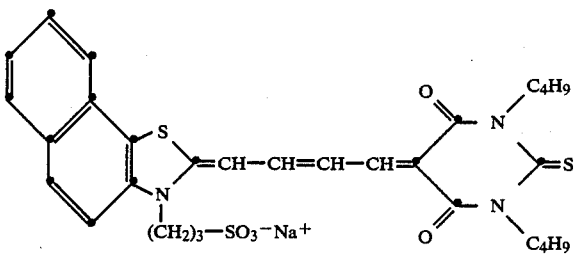

Compound 3

The compounds of the invention can be synthesized by condensation of a 2-methyl-3-sulfoalkylthiazolium hydroxide, inner salt with a 1,3-disubstituted 5-(3-alkoxy-2-propen-1-ylidene)-2-thiobarbituric acid in the presence of a tertiary amine such as triethylamine and a solvent such as acetonitrile or ethanol, with warming or gentle heating to form the ammonium sulfonate salt followed by cation exchange if desired (for example, treatment with sodium iodide to produce the sodium salt of the merocyanine dye or with barium acetate to form the barium salt), and finally treatment with a non-solvent if necessary to precipitate the dye.

Alternatively, a 5-unsubstituted barbituric acid can be condensed with a 2-[4-(acetanilido)-1,3-butadiene-1-yl]-3-sulfoalkylthiazolium hydroxide, inner salt under similar conditions.

The starting thiazolium hydroxide, inner salt is most conveniently prepared by an addition reaction of a sultone such as propane sultone, butane sultone, etc., to a parent thiazole such as a 2-methylbenzothiazole.

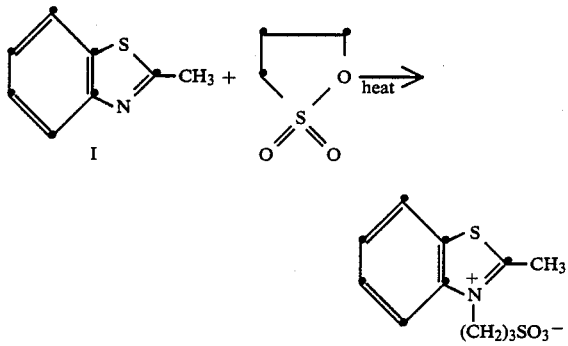

Alternatively, such inner salts can be prepared by an addition reaction between a parent thiazole such as I above and an unsaturated sulfonic acid such as 2-acrylamido-2-methylpropanesulfonic acid as follows:

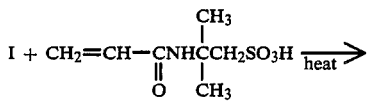

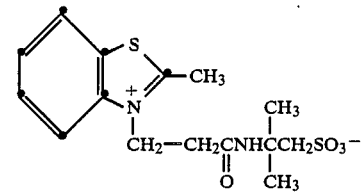

The 1,3-disubstituted-5-(3-alkoxy-2-propen-1-ylidene)-2-thiobarbituric acid derivatives are prepared by the condensation of 1,3,3-trimethoxy-1-propene with the parent 1,3-disubstituted thiobarbituric acid. The product is formed spontaneously as the reactants are mixed in acetone. The disubstituted thiobarbituric acid is obtained by condensation of an N,N'-disubstituted thiourea with diethyl malonate. The N,N'-disubstituted thioureas can be purchased commercially or prepared by conventional alkylation of the nitrogen atoms on the thiourea.

The 2-[4-(acetanilido)-1,3-butadien-1-yl-]-3-sulfoalkylthiazolium hydroxide, inner salt used in the alternative procedure is prepared by reaction of the parent 2-methylthiazolium hydroxide, inner salt with 1-anilino-3-phenylimino-1-propene hydrochloride available from Aldrich Chemical Co.

These compounds have been found to be useful as agents to destroy or inactivate viruses with the aid of photosensitization. The toxicity of these compounds is relatively low.

The compounds are normally used with light of suitable wavelength in an amount of about 5 to about 25 micrograms per milliliter of product.

The effective wavelengths of visible light that can be used vary greatly depending upon the absorption spectrum of the individual dyes; however, it is generally desired that the light be of a wavelength in the green to orange range. It appears, as expected, that light that is not being absorbed, i.e., blue light and long wavelength red light, is not particularly effective with these compounds.

Tests have shown that:

(1) Suspensions of Friend virus, Friend virus-transformed cells, Herpes simplex, HTLV-I and HTLV-I infected cells are rapidly inactivated by photosensitization with these compounds.

(2) The small amounts of dye that are transferred with the photosensitized products or plasma/serum components are not toxic to mice. The effective amount of some of these compounds is about 100,000 times less than the $LD_{10}$ of the compound in mice.

The ability of these compounds to react with enveloped (i.e., lipid-containing) viruses was tested with the Friend erythroleukemia virus complex, the human T cell leukemia virus, HTLV-I and Herpes simplex 1. Friend virus was obtained from cell-free supernatants of cultured erythroleukemia cells or as a cell-free extract from infected animals. Simultaneous exposure to the compounds (15 μg/ml) and light (40 J/cm²) reduced the virus titer regardless of the origin of the virus preparation. Virus-infected spleen cells, bone marrow cells, and cultured Friend erythroleukemia cells were inactivated at about the same rate as cell-free virus preparations.

HTLV-I was also susceptible to the compound-mediated photosensitization. The amount of virus that could be sedimented by centrifugation was reduced after treatment with the compounds and light. The remainder of the virus were probably lysed. The small fraction that was sedimented was visibly stained by the compound. It is conceivable that the sedimented virus fraction, although not lysed, had sustained enough photodynamic damages to make it noninfectious. For example, when the virus is Herpes simplex 1, the order of magnitude reduction is as high as 45 times.

The demonstrated effectiveness of this method in inactivating Herpes simplex 1 makes it possible to treat herpes lesions by applying or injecting the compound-containing preparations onto or into the lesions.

The ability of the compounds to photosensitize in such lower concentrations should make it possible to use the dyes in dermatological products which can be painted on or injected into viral-containing lesions prior to exposure to visible light.

The compound which we have labeled Compound 1 (see structural formula below) reduces illumination times about six-fold in comparison to Merocyanine 540 when used in equimolar concentrations.

Compound 1

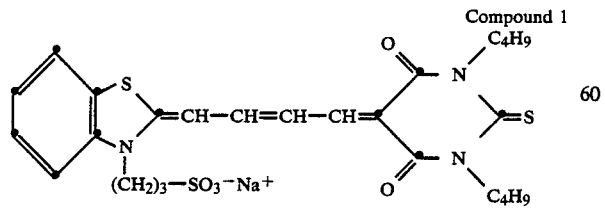

The compound-mediated photolysis of viruses appears to be primarily mediated by singlet oxygen. An additional two-fold reduction in illumination time can therefore be achieved by performing the photosensitization step in the presence of deuterium oxide ($D_2O$).

Unlike heat or high doses of ionizing irradiation, this compound-mediated photolysis is more selective in its toxicity. Dye-mediated photosensitization may be the preferred anti-viral treatment in situations where critical components are temperature- or radiation-sensitive. In addition, the acute systemic toxicity of these dyes is very low. Also, the amount of dye that is injected with a typical mouse bone marrow graft is more than 100,000 times less than the $LD_{10}$ in the same species.

Surprisingly, tests have shown that inactivated viruses retain their antigenic properties. Thus, it should be possible to make vaccines using the viruses inactivated by the method of the present invention.

Representative of the viruses which can be inactivated by the compounds of the present invention are those previously described as well as the viruses which cause human and animal diseases, such as bovine viral diarrhea, and viruses which infect bacterial products, such as the Epstein Barr virus.

More detailed information concerning the anti-viral process of using these compounds with photolysis is found in the previously mentioned Sieber U.S. patent application Ser. No. 933,697.

These novel compounds are also useful in eliminating residual tumor cells from bone marrow grafts by treatment with photolysis. These compounds bind to the lipid portion of the plasma membrane and the photolysis with these compounds is effective against a broad range of leukemias and solid tumors, including drug-resistant tumors. The advantageous use of these compounds is that normal circulating leukocytes and red cells have a low affinity to them and light in the presence of serum appears to have little or no acute cytotoxic effects.

This invention is further illustrated by the following examples.

EXAMPLE 1

Preparation of

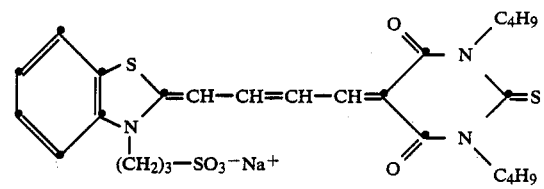

To a reactor was added 1.08 g (4 mmole) of

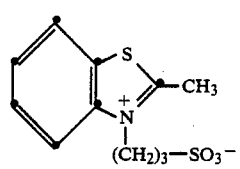

prepared from the parent 2-methylbenzothiazole and propane sultone in 50 ml of methanol and the mixture was stirred. To the mixture was added 1.30 g (4 mmole)

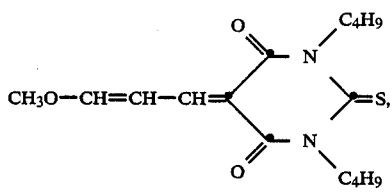

obtained from the condensation of the disubstituted thiobarbituric acid with 1,3,3-trimethoxy-1-propene and 1 ml triethylamine (TEA). The mixture was stirred for 20 minutes, filtered, and 1.5 g NaI was added to the filtrate. The mixture was stirred for 20 minutes, filtered and recrystallized from methanol.

The product yield was 1.55 g having a calculated molecular weight of 585.74, a λ-max of 587 nm in methanol, an extinction coefficient $\epsilon = 16.5 \times 10^4$, and a fluorescence emission maximum at 618 nm. The UV visible spectrum is consistent with the assigned structure and the compound was shown to be pure by both electrophoresis and thin layer chromatography.

EXAMPLE 2

Preparation of

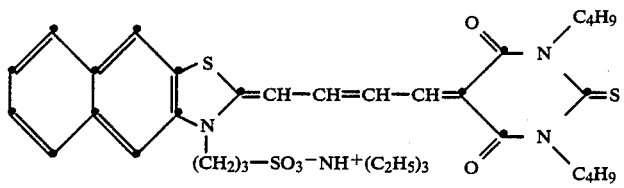

Part A

Preparation of

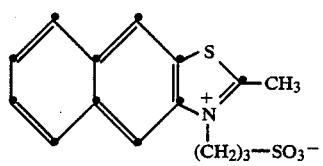

A mixture of 10 g of 2-methylnaphth[3,2-d]-thiazole and 6.5 g of propane sultone (available from Aldrich Chemical Co. and Eastman Kodak Co., respectively) in 75 ml of acetonitrile was heated at reflux for about 70.5 hours, cooled, collected by filtration, and the solid washed with acetone, then with ether, and dried to yield 9.4 g. The mother liquors were refluxed another 5 days and worked up the same way to produce another 4.6 g.

Part B

A mixture of 1.6 g of the inner salt from Part A, 1.62 g of

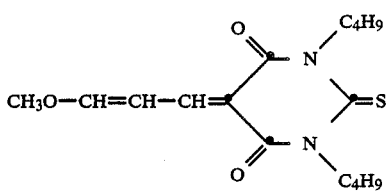

prepared from the condensation of the disubstituted thiobarbituric acid with 1,3,3-trimethoxy-1-propene, and 200 ml of ethanol was heated to a boil to dissolve the solids. A sample was scratched in a test tube to produce seed crystals and a solution of 0.75 g of triethylamine in ethanol was rapidly added followed by the seed crystals. The walls of the container were seeded with stirring and the mixture was permitted to cool. Well defined crystalline masses appeared in the deep blue solution. The mixture was chilled in an ice box, the product collected on a filter, washed with ethanol, then acetone, and finally diethyl ether, and dried to produce 3.2 g of black crystals. The crystals were dissolved in 450 ml of hot ethanol, the solution seeded with seeds prepared by scratching a sample in a test tube, and then cooled slowly to room temperature, and finally chilled for several hours in an ice box. The product was collected on a filter, rinsed with ethanol, acetone, and diethyl ether in that order, and air-dried to produce 2.31 g which was further vacuum dried overnight at 40° C.

The dye, having a calculated molecular weight of 715.00, and a λ-max in ethanol at 604 nm, an extinction coefficient $\epsilon = 25.6 \times 10^4$, and a solution of 2.163 mg of the dye in 312.5 ml of ethanol had an optical density of 2.484. The UV visible spectrum was consistent with the assigned structure.

EXAMPLE 3

Preparation of

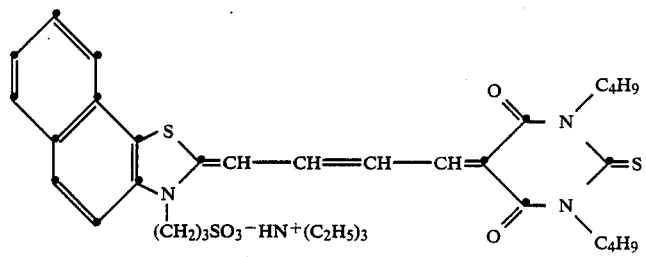

Part A

Preparation of

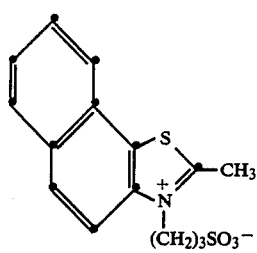

To a reactor was added 20 gram of

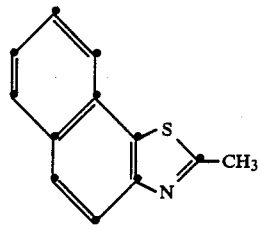

available from Aldrich Chemical Co., 13 g of propane sultone, available from Eastman Kodak Co., and 100 ml of acetonitrile. The mixture was heated at reflux for about 20 hours, cooled and filtered to produce a first crop of crystals which were washed with acetone and with ether and dried to yield 10.0 g of white powder. The mother liquors were refluxed for about another 2.5 days. The mixture was diluted with an equal volume of acetone, chilled and filtered, and the solid washed with acetone and with diethyl ether to produce, after drying, 10.0 g of tan powder. The first crop of material was used in Part B.

Part B

Preparation of the Merocyanine Dye
A solution of 1.6 g of

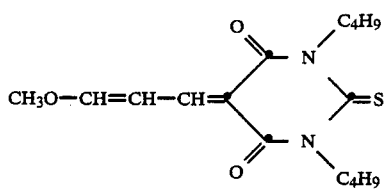

prepared from the condensation of the disubstituted thiobarbituric acid with 1,3,3-trimethoxy-1-propene in 150 ml of hot acetonitrile was treated with 1.6 g of the inner salt from Part A, then dropwise with a solution of 0.70 g of triethylamine in acetonitrile. The deep blue solution was cooled to crystallize the dye, the crystals were collected by filtration, washed with acetonitrile, with acetone, and with diethyl ether, and dried to yield 3.1 g of crude material.

The crude product was taken up in about 300 ml of hot ethanol and chilled overnight in an ice box, collected and dried to produce 2.1 g of dye having a λ-max in ethanol of 610 nm, an extinction coefficient $\epsilon = 16.4 \times 10^4$ and a solution of 1.644 mg in 232.0 ml of ethanol had an optical density of 1.622. The UV visible spectrum was consistent with the assigned structure.

EXAMPLE 4

Preparation of

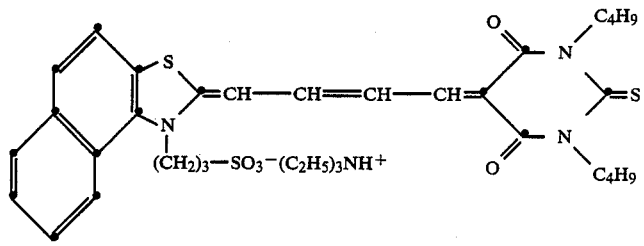

Part A

Preparation of

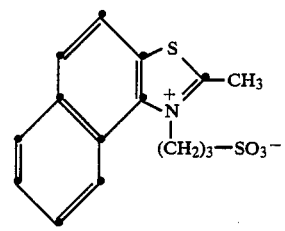

A mixture of 20 g of 2-methylnaphth[1,2-d]-thiazole and 13 g of propane sultone (available from Aldrich Chemical Co. and Eastman Kodak Co., respectively) was melted and immersed in an oil bath at 160°–180° C. for about 15 hours. The mixture was cooled, rinsed with acetone, and the solid lump remaining dissolved in about 200 ml of boiling water. The mixture was filtered hot from the melted starting material and about 500 ml of acetone was added to the hot filtrate with stirring to precipitate the product. The solid was collected by filtration and dried to yield 24 g of off-white powder.

Part B

Preparation of the Merocyanine Dye
A mixture of 1.6 g of the inner salt prepared in Part A and 1.62 g of

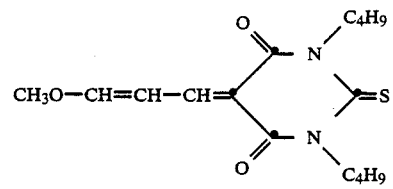

prepared from the condensation of the disubstituted thiobarbituric acid with 1,3,3-trimethoxy-1-propene, and 300 ml of ethanol was treated with 0.75 g of triethylamine, the mixture was boiled for about 5 minutes, cooled, seeded with crystals generated from a sample in a test tube, chilled in an ice box, and the solid collected on a filter, washed with acetone, then with diethyl ether, and dried to yield 2.4 g. Recrystallization from ethanol produced 1.97 g. The spectrum had a small peak at 700 nm which was removed by recrystallizing three more times from minimum amounts of fresh ethanol. The final yield of material having a clear spectrum was 590 mg.

The dye, having a calculated molecular weight of 715.00, had a λ-max in ethanol at 613 nm, and an extinction coefficient $\epsilon = 15.1 \times 10^4$. The UV visible spectrum was consistent with the assigned structure.

EXAMPLE 5

Preparation of

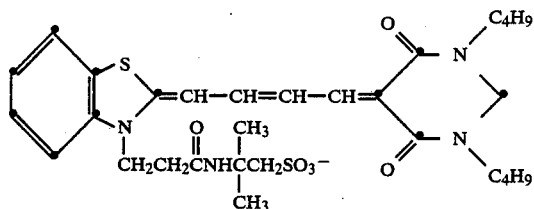

Part A

Preparation of

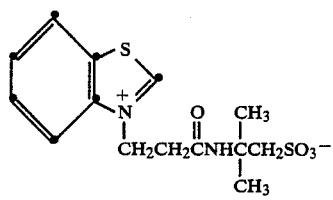

A mixture of 14.9 g of 2-methylbenzothiazole and 20.7 g of 2-acrylamido-2-methylpropanesulfonic acid, both available from Aldrich Chemical Co., in a 500 ml flask, was melted by immersion in an oil bath at about 130° C. A small amount of acetonitrile was added to obtain a homogeneous melt. The bath temperature was raised to 145° C. and maintained at that temperature for about 2½ hours, at which time the melt turns red and may be deteriorating. This crude melt was used in Part B without further treatment.

Part B

Preparation of the Merocyanine Dye
A mixture of 1.8 g of the inner salt from Part A, 1.6 g of

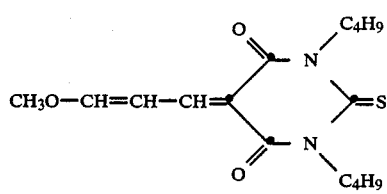

prepared by condensation of the disubstituted thiobarbituric acid with 1,3,3-trimethoxy-1-propene, and about 250 ml of ethanol was heated to a boil to dissolve all the solids, treated with 0.75 g of triethylamine and boiling was continued for 5 minutes. No crystals formed upon cooling. The solution was reheated, treated with 5 g of sodium iodide, cooled, the precipitate collected on a filter, washed with acetone and air dried to produce about 3.0 g. The solid was dissolved in 350 ml of hot methanol, filtered hot, reheated to a boil and treated with another 20 g of sodium iodide. The walls of the container were seeded by scratching, the mixture chilled to crystallize, and the precipitate filtered and dried to produce 1.3 g. Another recrystallization from methanol produced 390 mg.

EXAMPLE 6

When cultured F4–6 erythroleukemia cells, spleen, or marrow cells from diseased animals, cell-free extracts of cultured cells, spleen cells, or marrow cells, or cell-free supernatants of F-6 cultures were injected into healthy B6D2F1 mice, the spleen weights increased from about 60–70 mg to about 1500 mg within days. The animals became polycythemic and, eventually, died. When cell suspensions, cell-free extracts, or culture supernatants were photosensitized and exposed to light prior to injection, spleen weights remained normal, hematocrits remained normal, and the animals survived. Normal pluripotent hematopoietic stem cells (as determined by the ability of photosensitized marrow cells to rescue lethally irradiated syngeneic hosts) were spared by the photosensitization treatment. Virus preparations that were exposed to dye or light alone caused splenomegaly, polycythemia, and death. A series of experiments thus showed that the compounds of Examples 1–4 with photolysis inactivates free Friend virus, intracellular Friend virus, and Friend virus-infected cells.

The result of the experiments with treated and untreated mice with (30 minutes at 70 Watts/m²) and without (ambient daylight only) light treatment are shown in spleen weights in Table I below.

TABLE I

| Compound | Light | Spleen Weight (mg) |
|---|---|---|
| Normal Spleen (no virus) | | 59.6 |
| Spleen With Virus (no compound) | Daylight | 1460 |
| Example 1 | Daylight | 1470 |
| Example 1 | 70 Watts/m² for 30 minutes | 61.2 |

It can be seen from the above data that light treatment with the compounds of this invention effectively inactivated the virus cells as evidenced by the resulting spleen weight after treatment.

It will be readily understood by those skilled in the art that the foregoing description has been for purposes of illustration only and that a number of changes may be made without departing from the scope of the invention. Therefore, it is intended that the invention not be limited except by the claims.

What is claimed is:
1. A compound having the formula:

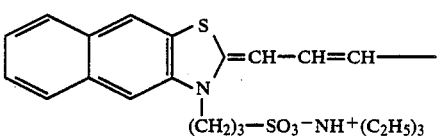

-continued
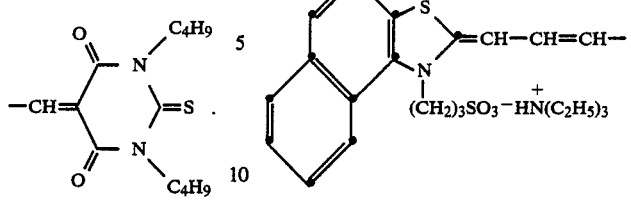
2. A compound having the formula:
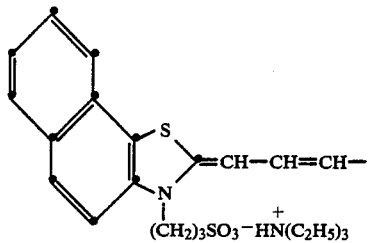
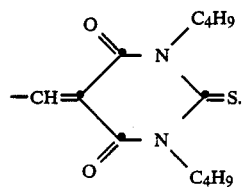
4. A compound having the formula:
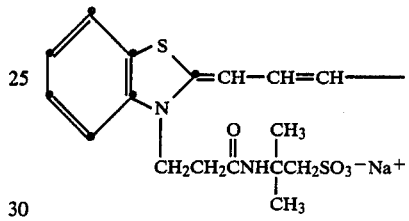
3. A compound having the formula:
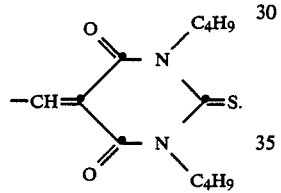
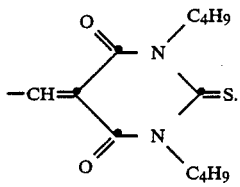
* * * * *